H. B. BRISTOL.
LOOSE LEAF BINDER.
APPLICATION FILED NOV. 11, 1910.
986,542.
Patented Mar. 14, 1911.
7 SHEETS—SHEET 3.
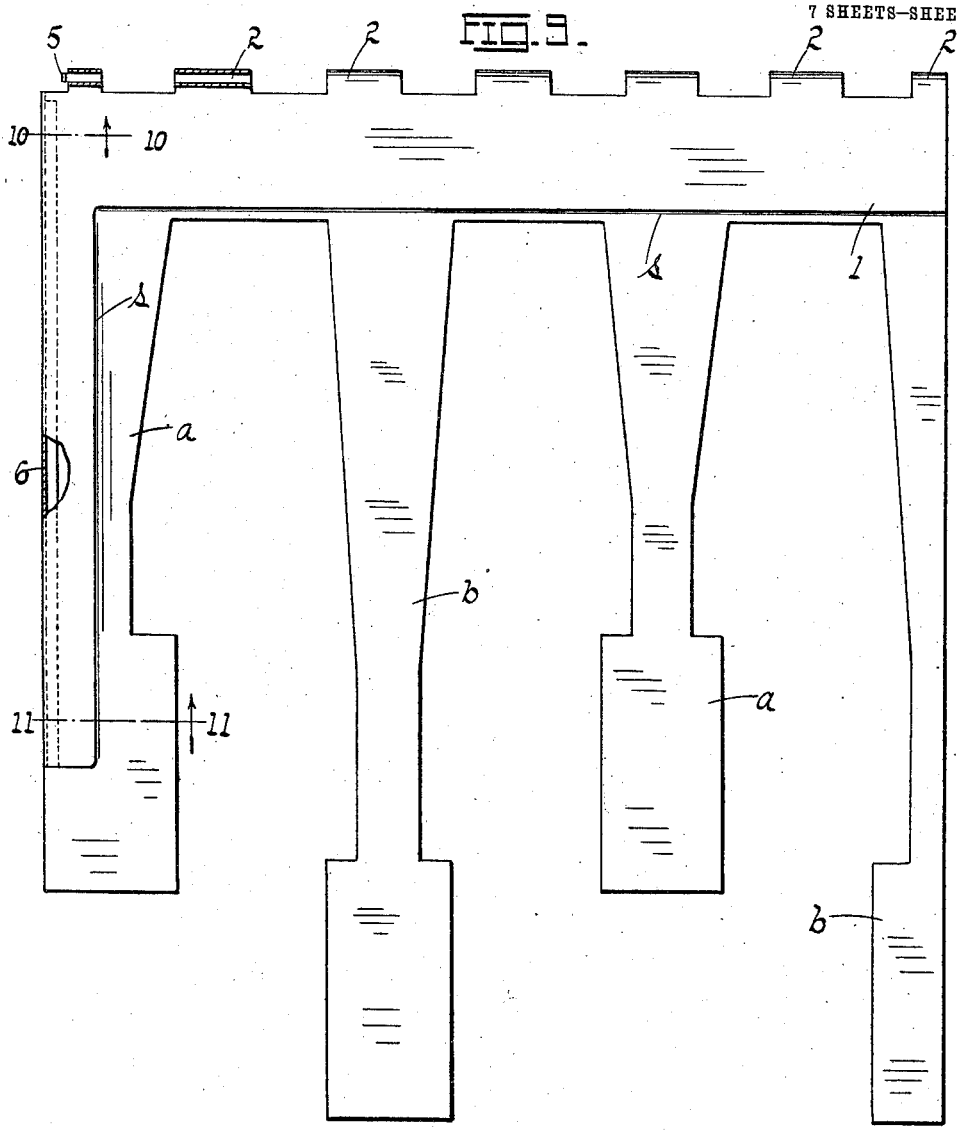
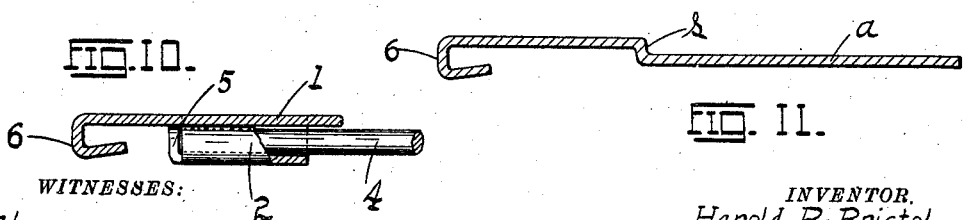
WITNESSES:
Harry A. Beimes
Fannie E. Weber
INVENTOR.
Harold B. Bristol.
BY
ATTORNEY.

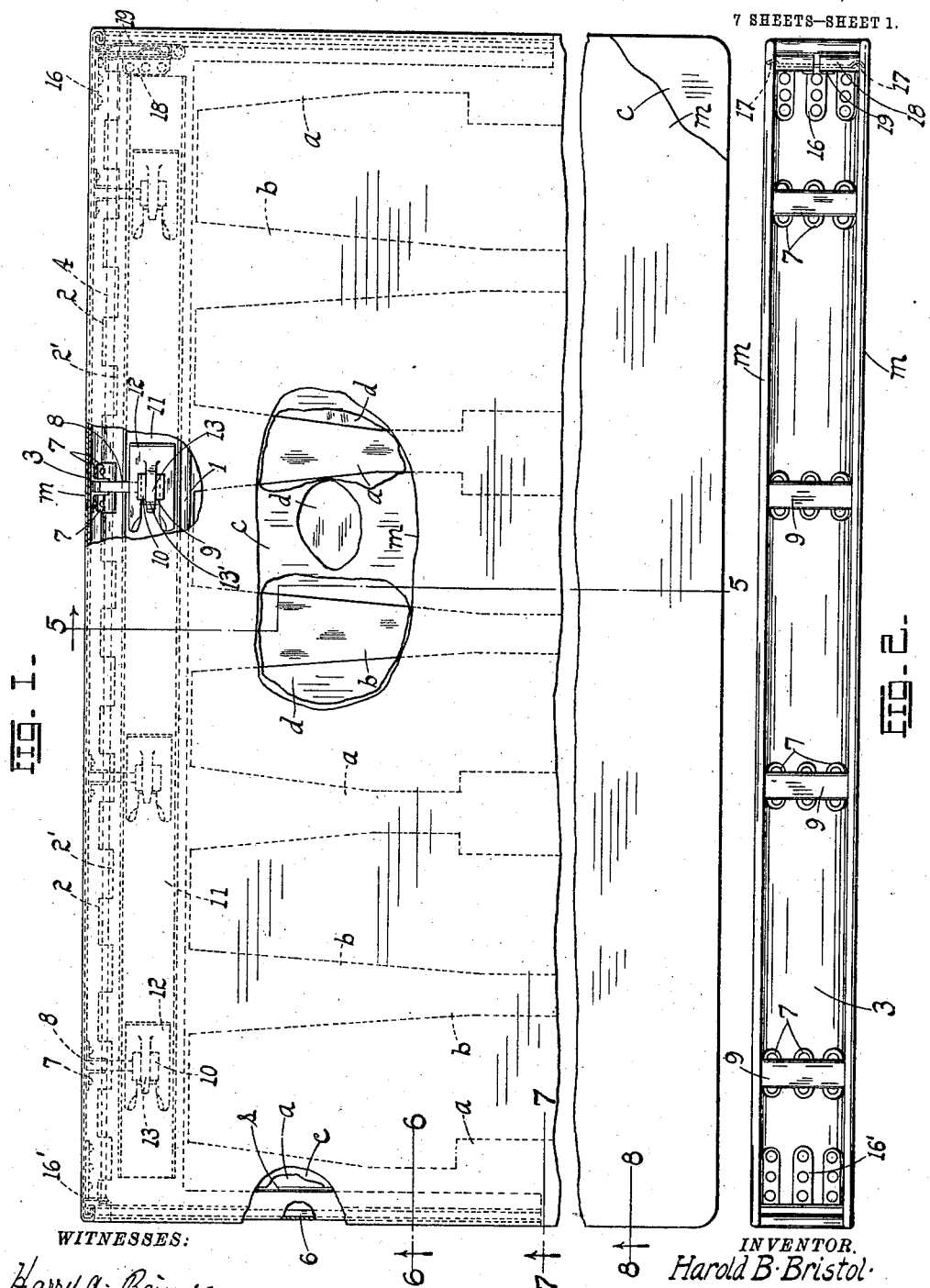

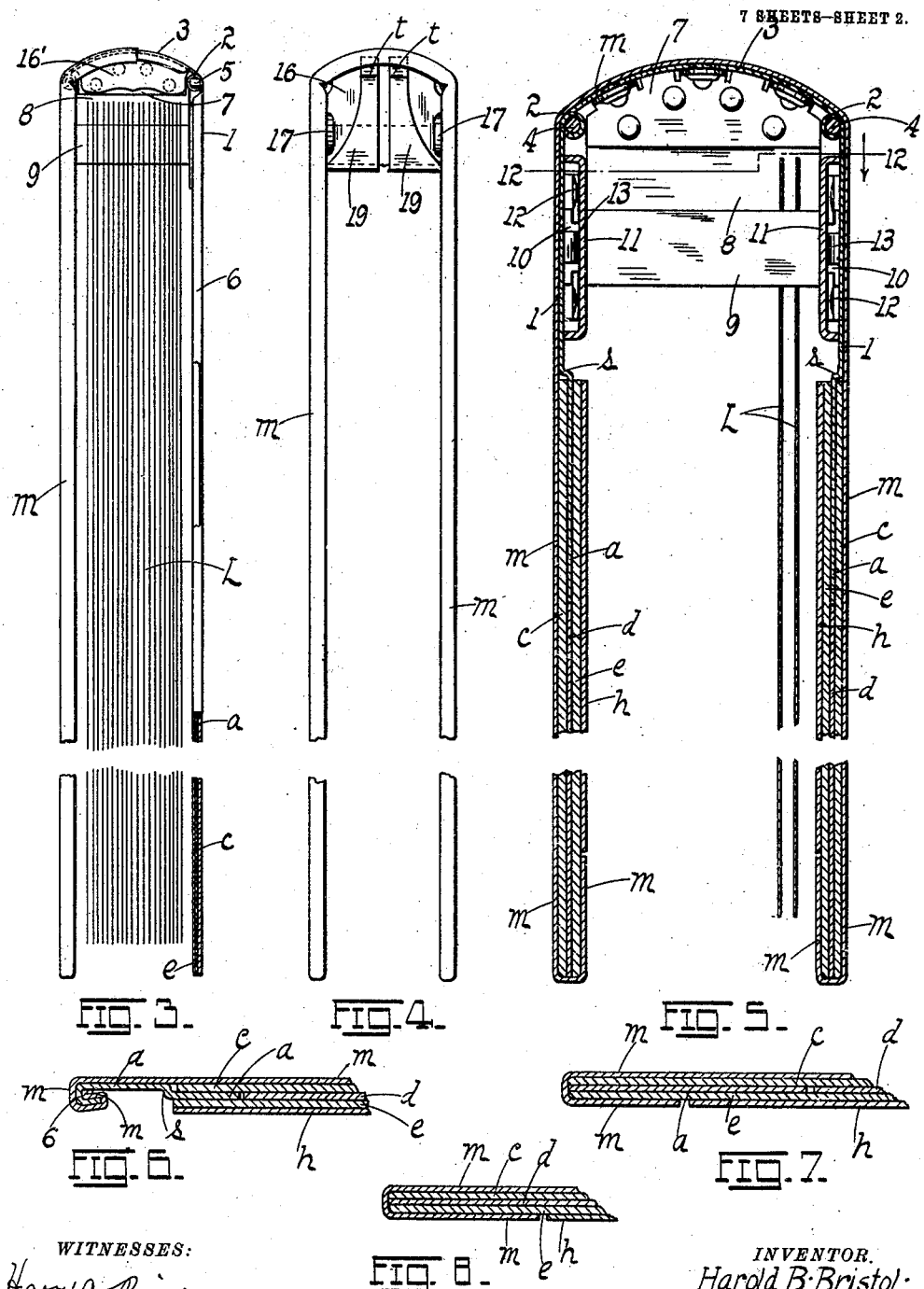

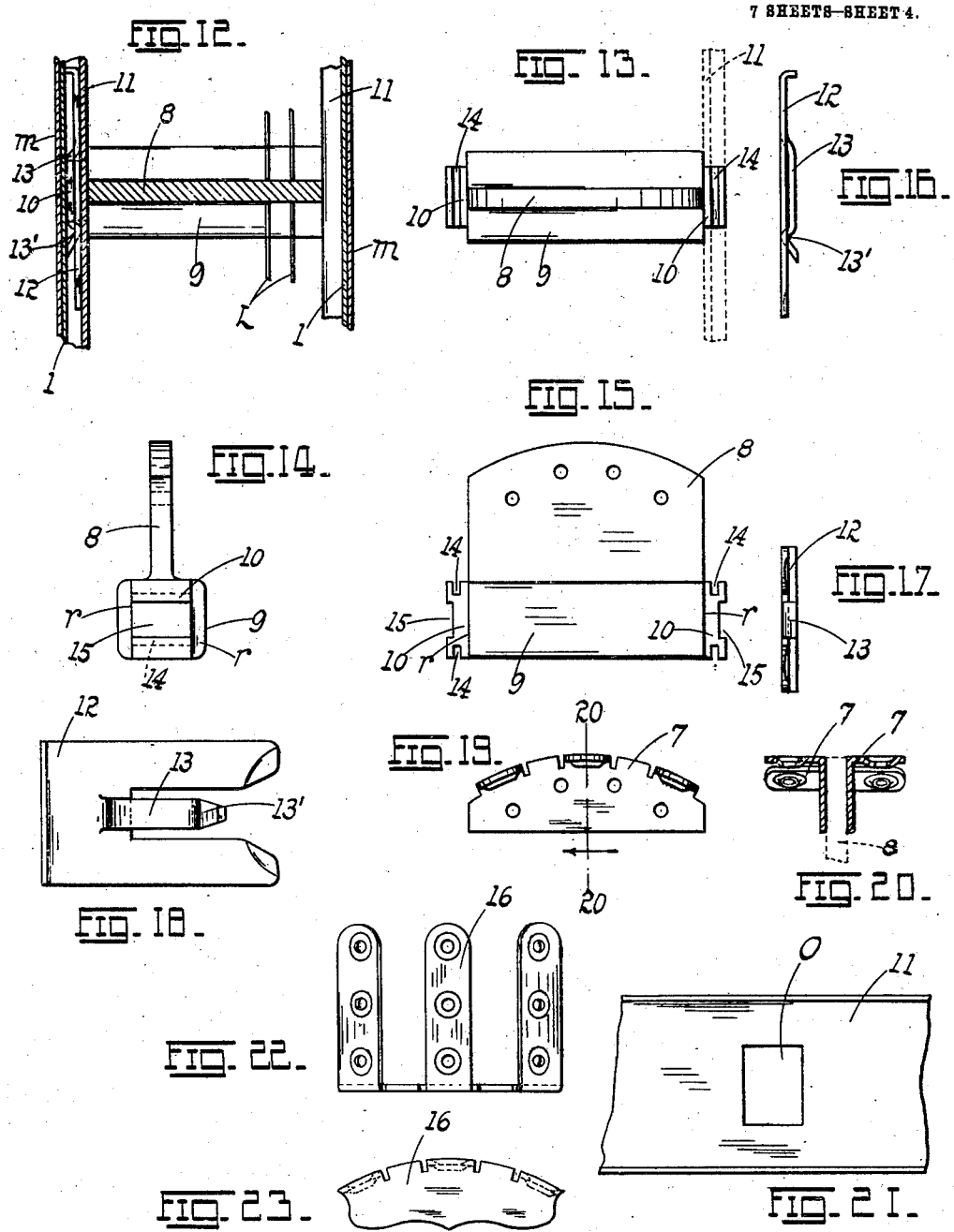

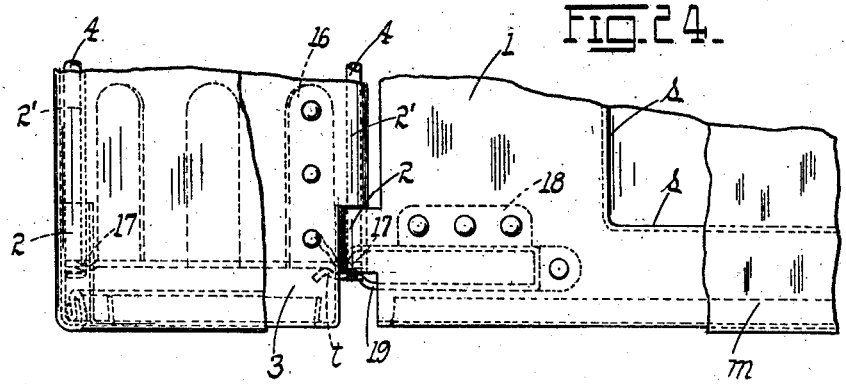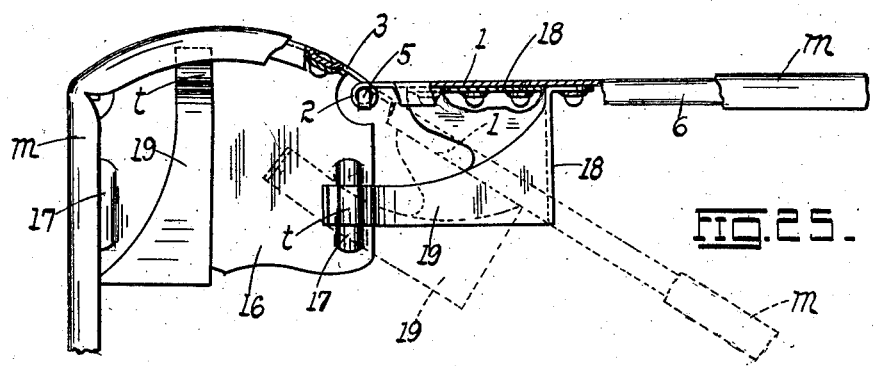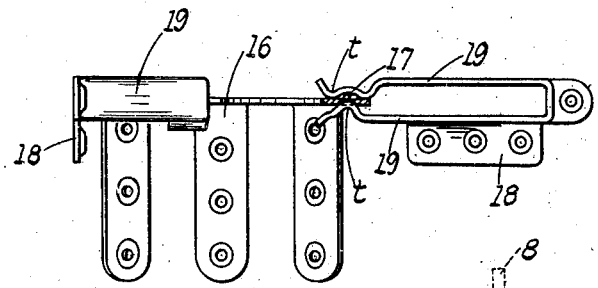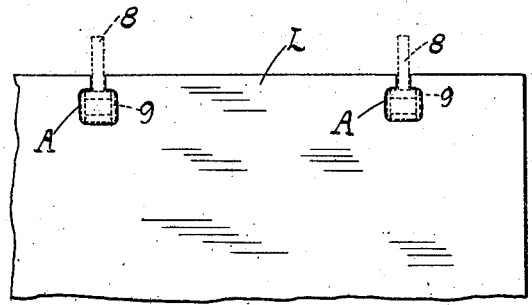

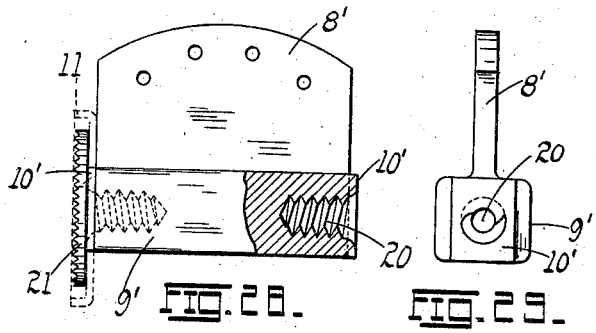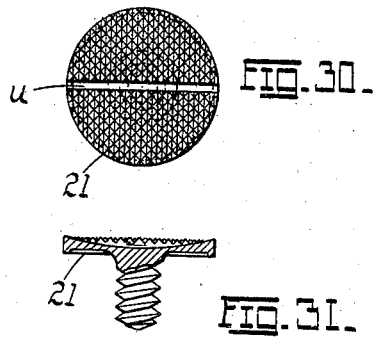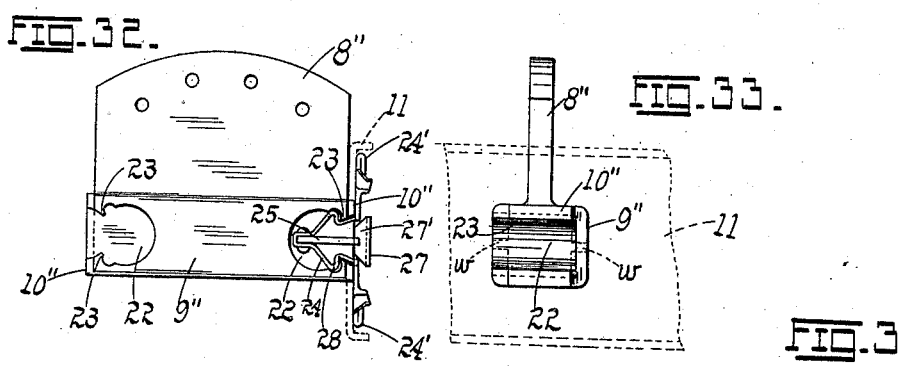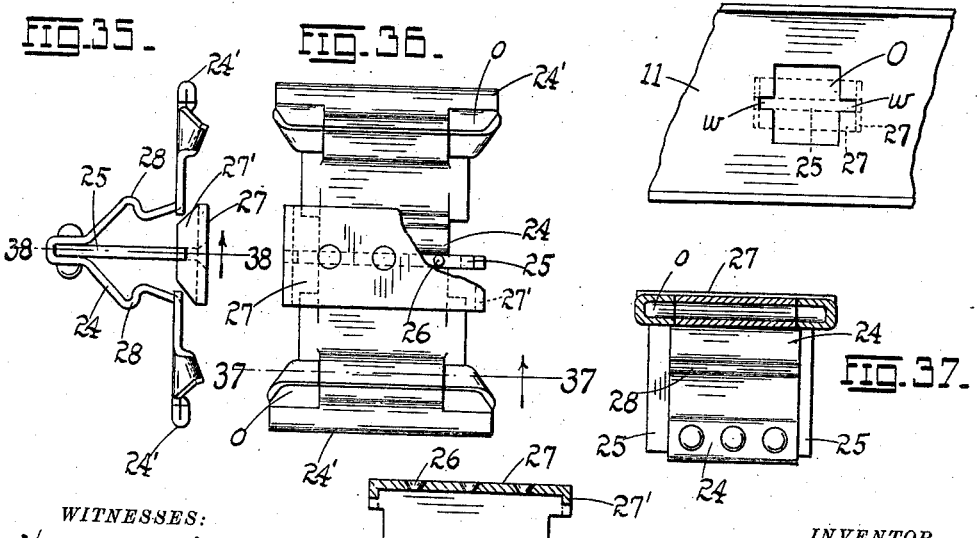

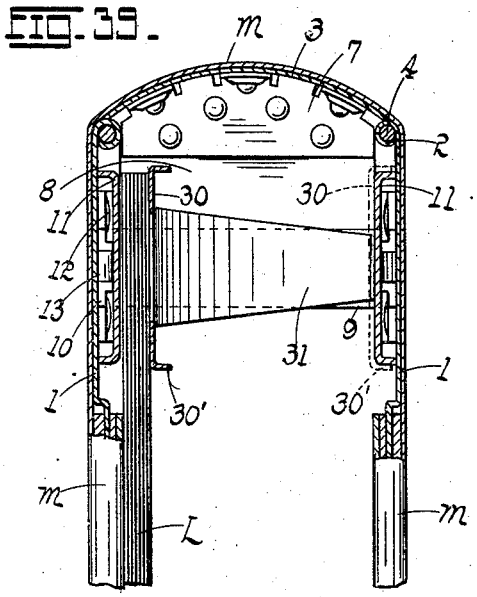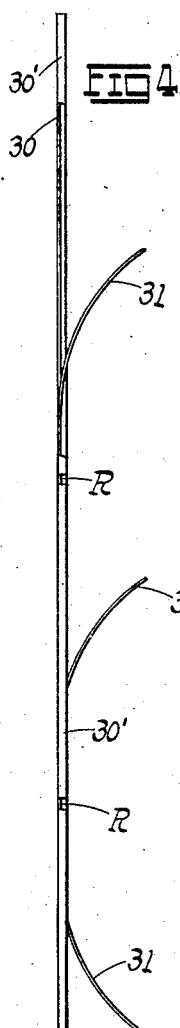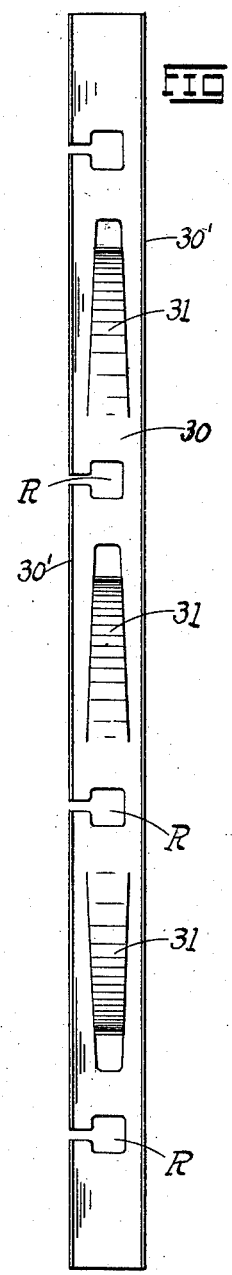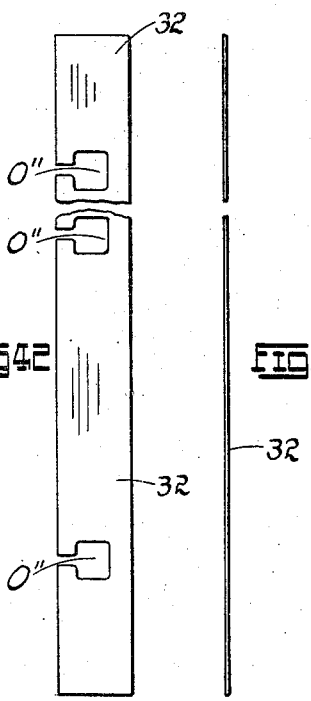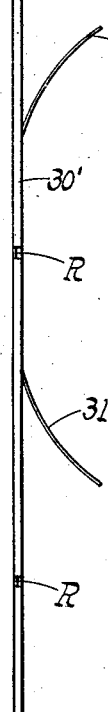

UNITED STATES PATENT OFFICE.

HAROLD B. BRISTOL, OF MAPLEWOOD, MISSOURI.

LOOSE-LEAF BINDER.

986,542.  Specification of Letters Patent.  Patented Mar. 14, 1911.

Application filed November 11, 1910. Serial No. 591,820.

*To all whom it may concern:*

Be it known that I, HAROLD B. BRISTOL, citizen of the United States, residing at Maplewood, in the county of St. Louis and State of Missouri, have invented certain new and useful Improvements in Loose-Leaf Binders, of which the following is a full, clear, and exact description, reference being had to the accompanying drawings, forming a part hereof.

My invention has relation to improvements in loose-leaf binders; and it consists in the novel details of construction more fully set forth in the specification and pointed out in the claims.

In the drawings, Figure 1 is a plan view of the binder in its closed position, broken at an intermediate point along the length of the covers, parts being removed to expose the interior structural details; Fig. 2 is an edge view looking through the open front of the same (the leaves being removed); Fig. 3 is a bottom end view with leaves in position and with parts of the outer leather (or equivalent) cover removed; Fig. 4 is a top end view with leaves removed; Fig. 5 is an enlarged section on the broken line 5—5 of Fig. 1; Fig. 6 is an enlarged sectional detail on the line 6—6 of Fig. 1; Fig. 7 is an enlarged sectional detail on the line 7—7 of Fig. 1; Fig. 8 is an enlarged sectional detail on the line 8—8 of Fig. 1; Fig. 9 is a plan of one-half of the metallic stiffening member entering into the construction of each of the covers of the binder; Fig. 10 is a sectional detail on the line 10—10 of Fig. 9; Fig. 11 is a sectional detail on the line 11—11 of Fig. 9; Fig. 12 is a sectional detail taken through one of the leaf-carrying anchors and covers adjacent thereto on the line 12—12 of Fig. 5; Fig. 13 is a top plan of the anchor; Fig. 14 is an end view thereof; Fig. 15 is a face elevation thereof; Fig. 16 is an edge view of one form of locking key for the leaves carried by the anchors; Fig. 17 is an end view of said key; Fig. 18 is a plan of said key; Fig. 19 is a face view of a pair of brackets carried by the back of the binder and between which the anchor is secured; Fig. 20 is a cross-section on the line 20—20 of Fig. 19; Fig. 21 is a face view of a portion of one of the longitudinal stiffening plates connecting the ends of the series of anchors and protecting the anchored ends of the leaves from direct contact with the covers; Fig. 22 is a top view of the bottom stiffening bracket secured to the back of the binder; Fig. 23 is a view at right angles to Fig. 22; Fig. 24 is an enlarged detail showing a top plan of one of the covers hinged to the back, swung to and locked in an open position; Fig. 25 is a view at right angles to Fig. 24; Fig. 26 is a detached view of the bracket and coöperating clip constituting the locking mehanism for the cover (in its open position); Fig. 27 is a plan of a portion of one of the leaves showing manner of attaching the same to the anchors; Fig. 28 is a face view of an anchor showing means for receiving a modified form of key for holding the longitudinal stiffening plates in position; Fig. 29 is an end view of Fig. 28; Fig. 30 is a face view of the modified key; Fig. 31 is a side view of Fig. 30 with parts in section; Fig. 32 is a face view of a still further modification of anchor and key therefor; Fig. 33 is an end view of Fig. 32 with key however, omitted; Fig. 34 is a face view of a portion of one of the longitudinal leaf-protecting and stiffening plates showing a notched opening to receive the tongue of the modified form of key shown in Fig. 32; Fig. 35 is an enlarged side view of the key shown in Fig. 32; Fig. 36 is a face view of said key; Fig. 37 is a sectional detail on line 37—37 of Fig. 36; Fig. 38 is a sectional detail on the line 38—38 of Fig. 35; Fig. 39 is a sectional detail on the order of Fig. 5 showing a spring follower or take-up for the leaves; Fig. 40 is an edge view of the take-up, parts being broken away; Fig. 41 is a face view of the take-up or follower; Fig. 42 is a face view of a spacing strip adapted to be interposed between the leaves; and Fig. 43 is an edge view of said spacing strip.

The object of my invention is to construct a loose-leaf binder (primarily intended for sheet music, though applicable to any loose sheet) by which leaves may be bound in book form. The present binder contemplates the employment of specially constructed anchors by which the leaves are secured; means for protecting the anchored ends of the leaves against direct contact with the covers; of special means for reinforcing the covers of the binder; of special devices for locking the covers in their open position; of special means for preventing a collapse of the covers when the leaves have been abstracted; of special devices for locking the leaf-protecting plates in position and thereby preventing the loss of any leaf; and of further and other structural features the advantages of which will be apparent from a detailed description of the invention which is as follows:

Referring to the drawings, and for the present to Figs. 1 to 27 inclusive, 1 represents a metallic plate provided with a series of arms a, b, of unequal length, an offset or shoulder s being formed at the bases of the arms and running substantially the full length of the terminal arms a, a, (Fig. 9), said shoulder not only imparting stiffness to the parts but serving a further purpose to be presently described. The outer edge of each plate (there being two in number) is provided with a series of loops 2 stamped and bent integral therewith, said loops alining with a similar series of marginal loops 2' (Fig. 24) of the plate 3 constituting the back of the binder, a hinge-pin 4 being inserted through the series of loops and forming a well known form of joint. In the present construction the terminal loops 2, have struck therefrom lips 5 at their outer ends which are subsequently bent across the loop opening and thereby prevent the dropping out or shifting of the hinge-pin or rod 4 (Fig. 10). The plates 1, 1, with their arms a, b, (which in practice reach about one-half or two-thirds across the width of the covers) form the reinforcing and stiffening portions of the covers, the latter being in the main composed of card-board or its equivalent. The covers may be described as follows:—Laid across the several arms a, b, and of a thickness equal substantially to that of the offset s and for the full area of the cover, is a layer of cardboard c which thereby forms with the plate 1 proper, an even surface over which is spread an outer layer of leather (or its equivalent) m. Laid upon the sheet c is a sheet d, suitably cut away in parts to accommodate the arms a, b, said sheet being of the same thickness as the arms and forming therewith an even surface for the support of the inner layer or sheet of cardboard e, the outer edges of which are protected by the inwardly-turned edges of the leather m (Figs. 7, 8) the balance of the layer e being protected by a facing or lining h. In this manner the plate 1 and its arms a, b become completely embedded between the cardboard and leather layers, making a very stiff cover. The outer margins of the terminal arms a and the opposite ends of the plate 1 proper are bent inwardly forming a U-shaped bend or bead 6 (Figs. 6, 10, 11), over which the leather cover m is passed and folded, thus imparting stiff edges to the covers. The leather layer m, covers the back 3 and the cardboard covers and is brought over the layer e along the front edges of the covers as well as at the top and bottom the same as is shown for the bottom in Fig. 8. A section taken through the front edge of the cover at right angles to the section line 8—8 in Fig. 1 would give the same illustration as is already shown in Fig. 8, and there is therefore no necessity for repeating the same. It may be stated in passing that the several layers m, c, d, e, and h, are properly cemented to one another and to the plate 1 and its arms a, b, forming altogether stiff and durable covers, the layer m being likewise cemented to the plate 3 forming the back, and the whole constituting a serviceable binder for the loose leaves L confined within it.

The manner of securing the leaves in place is as follows:—Disposed in pairs and secured to the inner face of the back 3 are series of angle-brackets 7 (Figs. 1, 19, 20) the legs secured to the back being formed into a series of lobes, the other and adjacent pair of legs receiving between them the web or wing 8 of an anchor head 9 disposed across the plate 3, the opposite ends of the head 9 terminating in reduced extensions or bearings 10 thereby forming a shoulder r with the end of the head proper, at the base of said extension (Figs. 14, 15). These bearings 10 support the longitudinal marginally flanged leaf-holding and stiffening plates 11, each plate being provided with a series of rectangular openings O through which the extensions 10 are passed. The plates 11 are then locked in position by forked keys 12, each key being provided with a central resilient or spring tongue 13 as shown. The extensions 10 are provided with opposite recesses or grooves 14, 14, through which the fork members of the key 12 are inserted, the spring tongue 13 being received by a terminal central recess or groove 15. When the key has been inserted far enough to cause the bend 13' of the tongue (Fig. 16) to pass beyond the end of the groove 15, the key becomes automatically locked to the bearing 10 and thereby retains or locks the plate 11 against displacement. When the covers are closed, the flanges of the plates 11 bear against the exposed portions of the cover plates 1, 1, (Fig. 5). In practice one plate 11 (which serves not only as a stiffening member, but a leaf retaining and protecting member as well) is first locked in position, after which the leaves L are passed over the anchor-heads 9, the rear edges of the leaves being provided with recesses or cut-away portions A of the proper shape (Fig. 27) to slip over the heads 9 and over the bases of the webs 8. When the required number of leaves have been strung on the heads 9, the opposite retainer plate 11 is placed in position, and the operation is completed.

It is desirable in practice, that when a cover is swung to an open position, it remain locked in such a position to prevent accidental closing of the book thus formed. This is accomplished as follows:—At the upper end of the back 3 is secured an angle-bracket 16 (Figs. 22–25) the leg immediately secured to the back being preferably formed into a series of fingers or lobes as shown, the opposite leg being disposed at right angles to the back or in a plane parallel to the plane of oscillation of the cover. On the leg projecting at right angles from the back 3 is formed or stamped on opposite sides a ridge or ribbed projection 17 (Figs. 24, 25, 26). To each cover-plate 1 and in proper relative position to the ribbed leg of the bracket 16 is secured a bracket 18 which has formed therewith a pair of clips or resilient arms 19 terminating in bends $t$ adapted to engage the opposite respectively concave and convex faces of the rib 17 of the bracket 16. The clips 19, 19, are so mounted that for a closed position of the book their free ends point upward to the end of the back 3 (Fig. 4); but when a cover is swung open, the clips sweep across the leg of the bracket in such a way that by the time the cover is full open, the bends $t$, automatically and forcibly engage the rib 17 (Figs. 24, 25) and thus lock the cover in its open position. Of course, the rounded edges of the rib and rounded bends $t$ of the clips permit the parts to become dislodged without much effort when occasion arises to again close the cover. Only one cover-locking device is necessary in practice, this being preferably located at the top of the book. At the bottom a similar stiffening bracket 16′ (Fig. 2) is secured, but without the ribs 17, its only purpose being to impart stiffness to the bottom of the book, and to lend symmetry to the general construction of the binder.

The locking means for the leaf-retaining plates 11, shown by the key 12 is not the only available method to which resort may be had, and in Figs. 28 to 38 inclusive I illustrate two other forms. In Figs. 28, 29, is shown a web 8′ provided with an anchor-head 9′ having a screw-socket 20 at each end passing through the extension 10′ and for a suitable distance into the head. In that case the plate 11 is held in position by a screw 21 provided with a milled head to be operated by hand, and with a groove $u$ for the insertion of a screw driver if desired. In Figs. 32 to 38 I show a web 8″ provided with an anchor head 9″ having a laterally opening pocket, cavity or chamber 22 at each end, said cavity being provided with opposite shoulders 23, behind which are adapted to automatically spring the resilient members or clamp-arms 24 when inserted into the cavity and subsequently released. The outer extensions 24′ of the arms 24 diverge from one another and are stamped in such a way at their free ends as to leave elongated openings $o$, $o$, for the insertion of the thumb and forefinger for purposes of compressing the springs preparatory to the insertion of the clamp into the chamber 22. At the bend between the spring arms 24 is riveted a tongue or plate 25, the outer edge of which is provided with dowels or pins 26 which are secured to a cap-piece 27 having terminal inwardly deflected tapering sides 27′, the edges of which are notched to receive the outer edge of the tongue. The sides of the tongue enter the recesses $w$ formed in the edges of the opening O of the plate 11 resting on the extension 10″ of the anchor head 9″. In practice, the cap-piece 27 may be seized by the fingers, the tongue 25 passed through the recesses $w$, the inclined bases of the springs 24 readily yielding or closing with the inward movement of the parts into the pocket 22, and when the bends 28 formed in the arms have passed behind the shoulders 23, they automatically spring behind them and thus lock the clamp in place. To remove the clamp, the operator inserts his thumb and forefinger into the openings $o$, $o$, compresses the springs 24 sufficiently to allow the bends 28 to pass by the shoulders 23, and pulls the clamp out of the pocket.

Where a full complement of leaves is mounted on the anchors 9 between the members 11, 11, the anchored edges of the leaves are sufficiently compacted to prevent the leaves from wabbling unduly when the book is opened. When however, a comparatively few leaves are in the binder some provision must be made to hold the leaves at their fastened edges sufficiently close together to prevent wabbling of the leaves and prevent their separation when the book is thrown open. To this end I provide a movable spring-controlled take-up member or follower 30 (Figs. 39–41) having recesses or openings R by which it may be passed over the anchors 9 between the outer leaf L of the series and the adjacent fixed plate 11, the follower having stamped therefrom outwardly flexed resilient, or spring arms 31 which bear against the plate 11 serving as an abutment and force the follower well up against the leaves, thereby crowding the anchored edges thereof close together so that they may be effectively held against wabbling or shifting when the covers are thrown open. Of course, the follower 30 is slipped over the anchors before the plate 11 is finally locked in place.

In lieu of the follower 30 I may substitute a series of spacing strips 32 (Figs. 42, 43) which may be passed over the anchors between each pair of leaves, and between the last leaf of the series and the adjacent stationary plate 11, a fact quite obvious from the drawings. The strips 32 are provided with recessed openings O″ by which they are passed over the anchors 9. Of course, where the strips 32 are used, dependence is placed on the numbers of strips to accomplish the holding of the sheets, whereas in using the follower 30 the springs 31 are depended on. The spring follower however, is the preferable means of the two.

As seen in Figs. 39 to 41 inclusive, the follower plate 30 is provided with marginal flanges 30', the width of the plate being such as to permit the said flanges to embrace the opposite edges of the plate 11 when the follower has been crowded up against the plate by an approximately full complement of leaves, interposed between it and the opposite plate 11 (dotted position Fig. 39.)

Having described my invention what I claim is:—

1. A loose-leaf binder comprising a back, members hinged thereto to form the covers, a series of anchor-heads disposed across the back between the covers and terminating in reduced extensions, a leaf protecting plate provided with opening for the insertion of the extensions whereby the plate rests on the extensions and bears against the shoulder formed at the base of the extension, and keys carried at the ends of the anchor-heads for locking the plates in position.

2. A loose-leaf binder comprising a back, covers hinged thereto, a series of anchor-heads disposed across the back between the covers and terminating in reduced extensions, the latter being provided with opposite recesses, and a central terminal groove, a leaf-protecting and stiffening member passed over the adjacent extensions at opposite ends of the several anchor-heads and shouldered against the heads, and keys provided with forks inserted into the recesses of the extensions, and resilient tongues traversing the outer grooves thereof for locking the leaf-protecting members in position.

3. A loose-leaf binder comprising a back, plates hinged to the sides thereof provided with a series of arms off-set from the body of the plate and extending at right angles from the hinge-axis of the plate, a sheet of fabric laid over the arms the full depth of the off-set, a second sheet of fabric laid on the first sheet and having portions removed to accommodate the arms of the plate and of a thickness equal to that of the arms, a third sheet laid on the second sheet, a final facing on the last named sheet, and an outer sheet cover spread over the back and the first mentioned sheet of the series, the several sheets being cemented together, and means on the back for holding thereto a series of loose-leaves, substantially as set forth.

4. A loose-leaf binder comprising a back, covers hinged thereto, a bracket carried by the back, and disposed parallel to the plane of oscillation of the covers, and a member on the cover provided with means for gripping the bracket when said cover is swung to open position and thereby locking the same.

5. A loose-leaf binder comprising a back, covers hinged thereto, a bracket carried at one end of the back and disposed parallel to the planes of oscillation of the covers, the sides of the bracket being provided each with a rib formation, a pair of resilient arms or clips secured to the cover at a suitable point from the hinge axis thereof, said arms embracing the bracket and adapted to sweep across the rib formation thereof, whereby upon the cover being swung to open position the clip-arms grip the rib on the bracket and lock the cover.

6. In a loose-leaf binder, a series of anchors carrying leaves, stationary protecting members secured to the opposite ends of the anchors, and a movable follower provided with flexed spring arms punched from the body of the follower and engaging the adjacent protecting member, the opposite face of the follower engaging the leaves, the said follower being provided with marginal flanges on the side facing the spring arms for embracing the edges of the protecting member when the follower has been crowded against it by a full complement of leaves.

In testimony whereof I affix my signature, in presence of two witnesses.

HAROLD B. BRISTOL.

Witnesses:
 EMIL STAREK,
 FANNIE E. WEBER.

---

Copies of this patent may be obtained for five cents each, by addressing the "Commissioner of Patents, Washington, D. C."